United States Patent
Stadie et al.

(10) Patent No.: US 11,104,515 B2
(45) Date of Patent: Aug. 31, 2021

(54) SEQUENCING SYSTEMS AND METHODS

(71) Applicant: OCADO INNOVATION LIMITED, Hatfield (GB)

(72) Inventors: Robert Rolf Stadie, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 309 days.

(21) Appl. No.: 15/781,597

(22) PCT Filed: Dec. 6, 2016

(86) PCT No.: PCT/EP2016/079805
§ 371 (c)(1),
(2) Date: Jun. 5, 2018

(87) PCT Pub. No.: WO2017/097724
PCT Pub. Date: Jun. 15, 2017

(65) Prior Publication Data
US 2020/0223633 A1 Jul. 16, 2020

(30) Foreign Application Priority Data
Dec. 6, 2015 (GB) ..................................... 1521488

(51) Int. Cl.
*B65G 1/04* (2006.01)
*G05B 19/418* (2006.01)
(Continued)

(52) U.S. Cl.
CPC .......... *B65G 1/0478* (2013.01); *B25J 9/0093* (2013.01); *B65G 1/0414* (2013.01);
(Continued)

(58) Field of Classification Search
CPC ..... B65G 1/0478; B65G 1/065; B65G 1/0464
See application file for complete search history.

(56) References Cited

U.S. PATENT DOCUMENTS

| 2,701,065 A | 2/1955 | Bertel |
| 6,654,662 B1 | 11/2003 | Hognaland |
(Continued)

FOREIGN PATENT DOCUMENTS

| EP | 0 767 113 B1 | 7/2002 |
| EP | 1 037 828 B1 | 9/2003 |
(Continued)

OTHER PUBLICATIONS

International Search Report (PCT/ISA/210) dated Mar. 7, 2017, by the European Patent Office as the International Searching Authority for International Application No. PCT/EP2016/079805.
(Continued)

*Primary Examiner* — Thomas Randazzo
(74) *Attorney, Agent, or Firm* — Buchanan Ingersoll & Rooney PC (57) ABSTRACT

A sequencing system and a robotic storage and picking system include a plurality of containers disposed in stacks beneath a grid having a first set of tracks and second set of tracks, the first and second sets of tracks being disposed substantially perpendicular to each other. Plural load handling devices are operable on the grid, the load handling devices lifting and depositing containers from and to the stacks. The load handling devices can deposit containers on to conveyor belts into predetermined positions, the positions being fillable in any random order and multiple positions being fillable at any one time.

17 Claims, 10 Drawing Sheets

(51) Int. Cl.
*G06Q 10/08* (2012.01)
*B65G 1/137* (2006.01)
*B65G 1/06* (2006.01)
*B25J 9/00* (2006.01)
*G05B 15/02* (2006.01)

(52) U.S. Cl.
CPC ......... *B65G 1/0457* (2013.01); *B65G 1/0464* (2013.01); *B65G 1/0492* (2013.01); *B65G 1/065* (2013.01); *B65G 1/1373* (2013.01); *G05B 15/02* (2013.01); *G05B 19/41895* (2013.01); *G06Q 10/087* (2013.01); *B65G 2201/0285* (2013.01)

(56) References Cited

U.S. PATENT DOCUMENTS

| | | | |
|---|---|---|---|
| 9,579,693 B2* | 2/2017 | Hausladen | B07C 5/38 |
| 2006/0056951 A1 | 3/2006 | Williamson et al. | |
| 2008/0213073 A1* | 9/2008 | Benedict | B66C 7/12 |
| | | | 414/279 |
| 2008/0270327 A1* | 10/2008 | Freudelsperger | B65G 1/1376 |
| | | | 705/500 |
| 2011/0027059 A1* | 2/2011 | Benedict | B66C 13/08 |
| | | | 414/803 |
| 2015/0307276 A1* | 10/2015 | Hognaland | G05B 19/41895 |
| | | | 700/218 |
| 2016/0129587 A1* | 5/2016 | Lindbo | B65D 21/02 |
| | | | 700/218 |
| 2016/0145058 A1* | 5/2016 | Lindbo | B65G 1/0485 |
| | | | 700/218 |

FOREIGN PATENT DOCUMENTS

| | | |
|---|---|---|
| GB | 2517264 A | 2/2015 |
| GB | 2 518 259 A | 3/2015 |
| NO | 317366 B1 | 10/2004 |
| WO | 2008059573 A1 | 5/2008 |
| WO | 2008091733 A2 | 7/2008 |
| WO | 2014142107 A1 | 9/2014 |
| WO | WO 2014/203126 A1 | 12/2014 |

OTHER PUBLICATIONS

Written Opinion (PCT/ISA/237) dated Mar. 7, 2017, by the European Patent Office as the International Searching Authority for International Application No. PCT/EP2016/079805.

Combined Search and Examination Report Under Sections 17 and 18(3) dated May 19, 2017 in corresponding Great Britain Patent Application No. GB1620692.2 (7 pages).

Examination Report Under Section 18(3) dated Apr. 23, 2018 in corresponding Great Britain Patent Application No. GB1620692.2 (5 pages).

* cited by examiner

SEQUENCING SYSTEMS AND METHODS

The present invention relates to sequencing systems and methods. More specifically but not exclusively, it relates to sequencing systems and methods for robotic storage and picking systems having bins in stacks, the stacks being located within a grid structure.

This application claims priority from UK Patent Application No GB1521488.5 filed 6 Dec. 2015, the entire content of which is hereby incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins are removed from the stacks and accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Figure 3A:
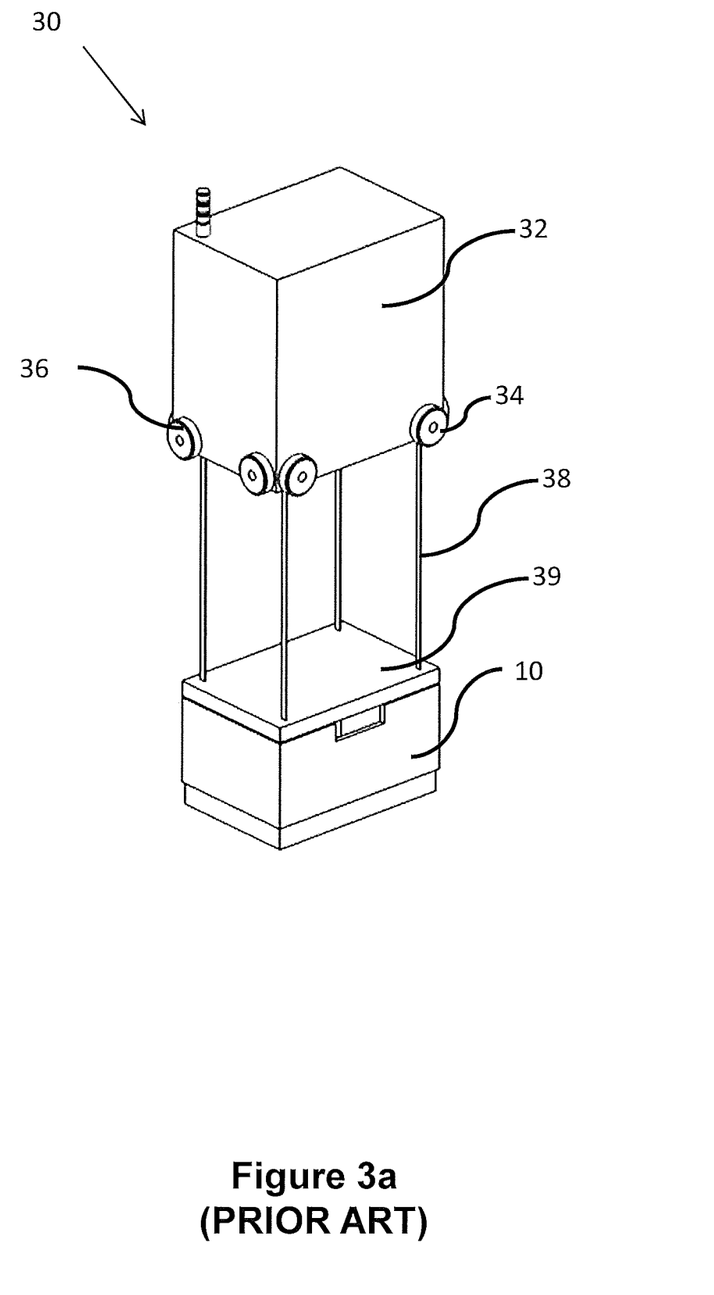
FIGS. 3(a) and 3(b) are schematic, perspective views, from the rear and front respectively, of one form of robotic load handling device for use with the frame structure of FIGS. 1 and 2.
Figures 3B, 3C:
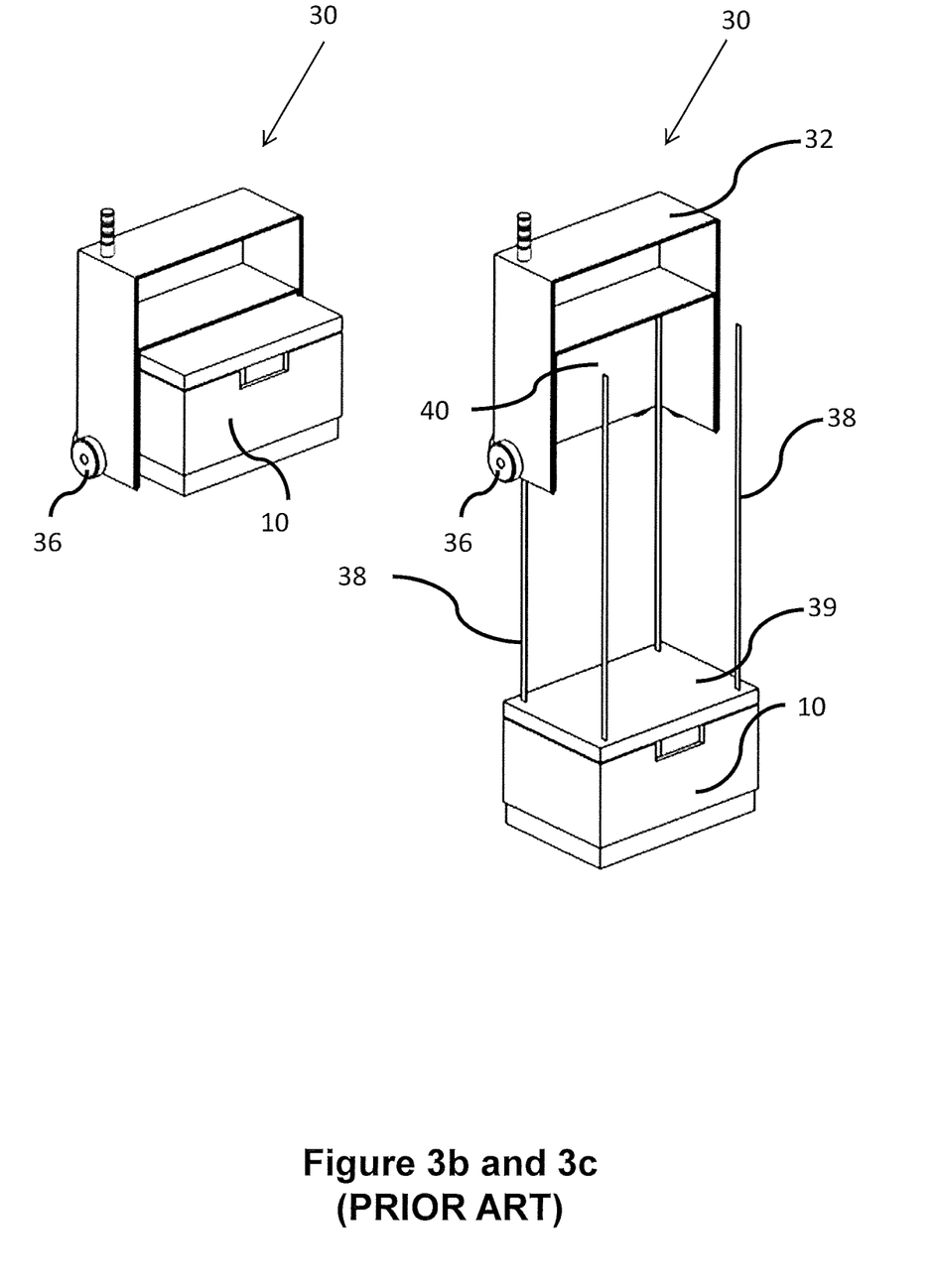
FIG. 3(c) is a schematic perspective view of the known load handler device in use lifting a bin.

Other forms of robotic load handling device are further described in, for example, Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No. GB1314313.6—Ocado Innovation Limited—where each robotic load handler only covers one grid space, thus allowing higher density of load handlers and thus higher throughput of a given size system. However, any suitable form of load handling device may be used.

In the known robotic picking systems described above, robotic load handling devices are controllably moved around the top of the stacks on a track system forming a grid. A given load handling device lifts a bin from the stack, the container being lifter containing inventory items needed to fulfil a customer order. The container is carried to a pick station where the required inventory item may be manually removed from the bin and placed in a delivery container, the delivery container forming part of the customer order, and being manually filled for dispatch at the appropriate time. At the pick station, the items may also be picked by industrial robots, suitable for such work, for example as described in UK Patent Application No GB1502123.1—Ocado Innovation Limited.

In the known systems above, the ultimate goal is to fulfil customer orders. The containers will contain, either individually or in quantity a customer order and these containers need to be loaded on to delivery vehicles and dispatched. All the systems described above result in containers at various locations within the storage system but needing to be brought together to form a coherent delivery route to be loaded in to a vehicle for delivery.

The present invention aims to overcome the problems associated in the above systems of combining disparate containers in to a coherent group sorted according to customer order or delivery route. Additionally, the sequencing method as described below enables containers to be sequenced for any other reason, for example for transference between two separate parts of a storage system, or for movement across a large storage system or for movement to a small fulfilment centre from a large fulfilment centre or vice versa.

According to the invention there is provided a sequencing system for a storage and picking system, the sequencing system comprising a portion of a storage system, the storage system comprising: a first set of substantially parallel rails or tracks and a second set of substantially parallel rails or tracks extending substantially perpendicularly to the first set in a substantially horizontal plane to form a grid pattern of tracks comprising a plurality of grid spaces; a set of uprights, the uprights supporting the tracks, the uprights and tracks together defining a framework; a plurality of containers located beneath the tracks in stacks and within the framework, a portion of the containers occupying a space below a grid space; and a plurality of load handling devices operable on the grid, the load handling devices comprising means for lifting containers from beneath the grid and means for depositing containers beneath the grid;

characterised in that the sequencing system comprises: a portion of the grid disposed above conveyance means, the conveyance means comprising a series of positions, said positions being defined by the grid spaces above the conveyance means, said positions on the conveyance means being allocatable and accessible for containers to be deposited thereon in a predetermined sequence.

According to a second aspect of the invention there is provided a method of sequencing containers from a storage and order picking system, the system comprising a first set of substantially parallel rails or tracks and a second set of substantially parallel rails or tracks extending substantially perpendicularly to the first set in a substantially horizontal plane to form a grid pattern of tracks comprising a plurality of grid spaces; a set of uprights, the uprights supporting the tracks, the uprights and tracks together defining a framework; a plurality of containers located beneath the tracks in stacks and within the framework, a portion of the containers occupying a space below a grid space; and a plurality of load handling devices operable on the grid, the load handling devices comprising means for lifting containers from beneath the grid and means for depositing containers beneath the grid, a portion of the grid being disposed above conveyance means, the conveyance means comprising a series of positions, said positions being defined by the grid spaces above the conveyance means, said positions on the conveyance means comprising positions allocatable to containers in a predetermined schedule the method comprising the steps of: (a) depositing a first container in a first position on the conveyance means; (b) depositing a second container in a second position on the conveyance means; and (c) repeating steps (a) and (b) until all the required positions on the conveyance means are filled characterised in that the positions are allocatable and accessible for containers to be deposited thereon according to a predetermined schedule.

In this way, containers may be grouped and sequenced as required.

The invention will now be described in detail below with reference to the accompanying diagrammatic drawings in which.

Figure 1:
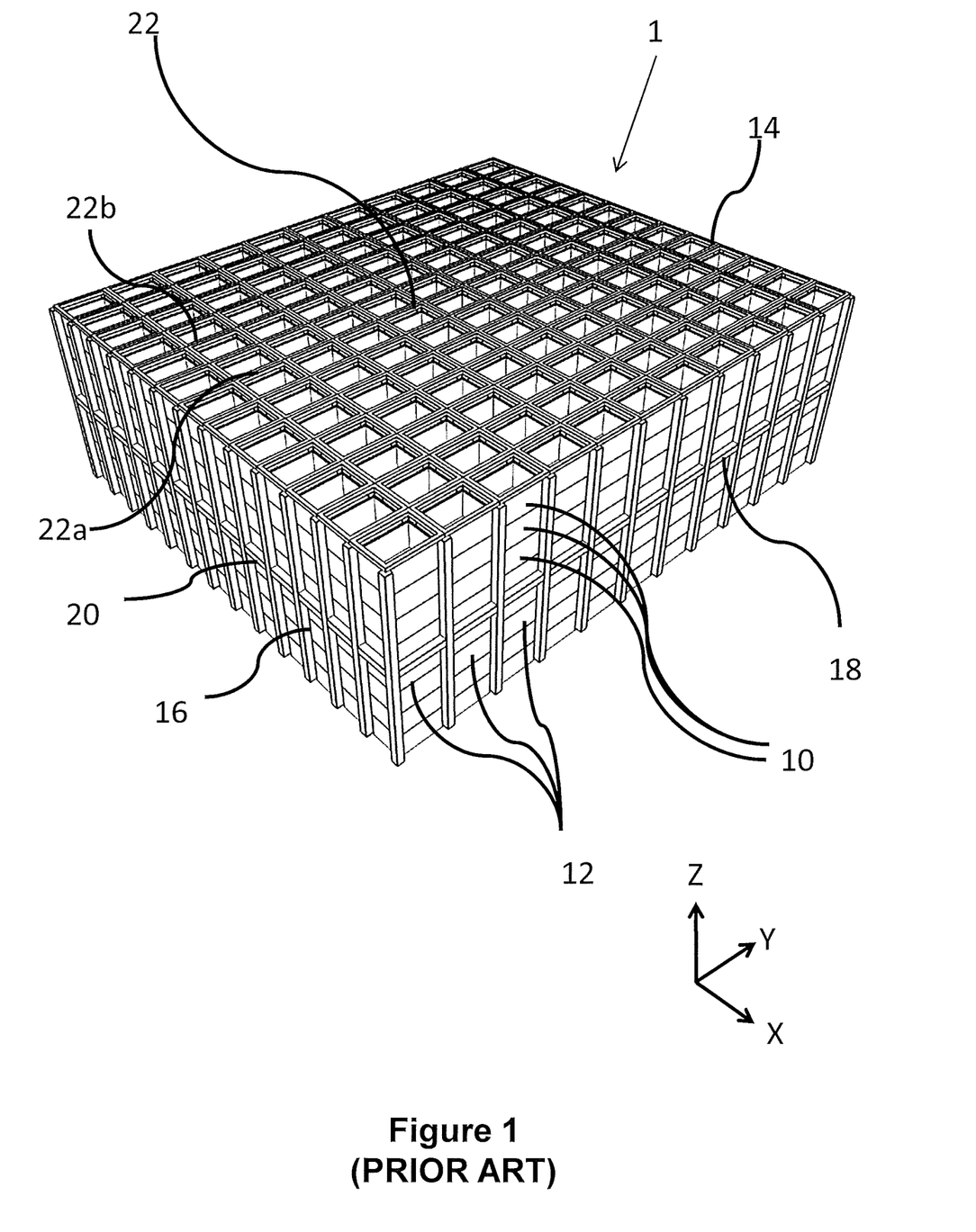
FIG. 1 is a schematic, perspective view of a frame structure for housing a plurality of stacks of bins in a storage system.
Figure 2:
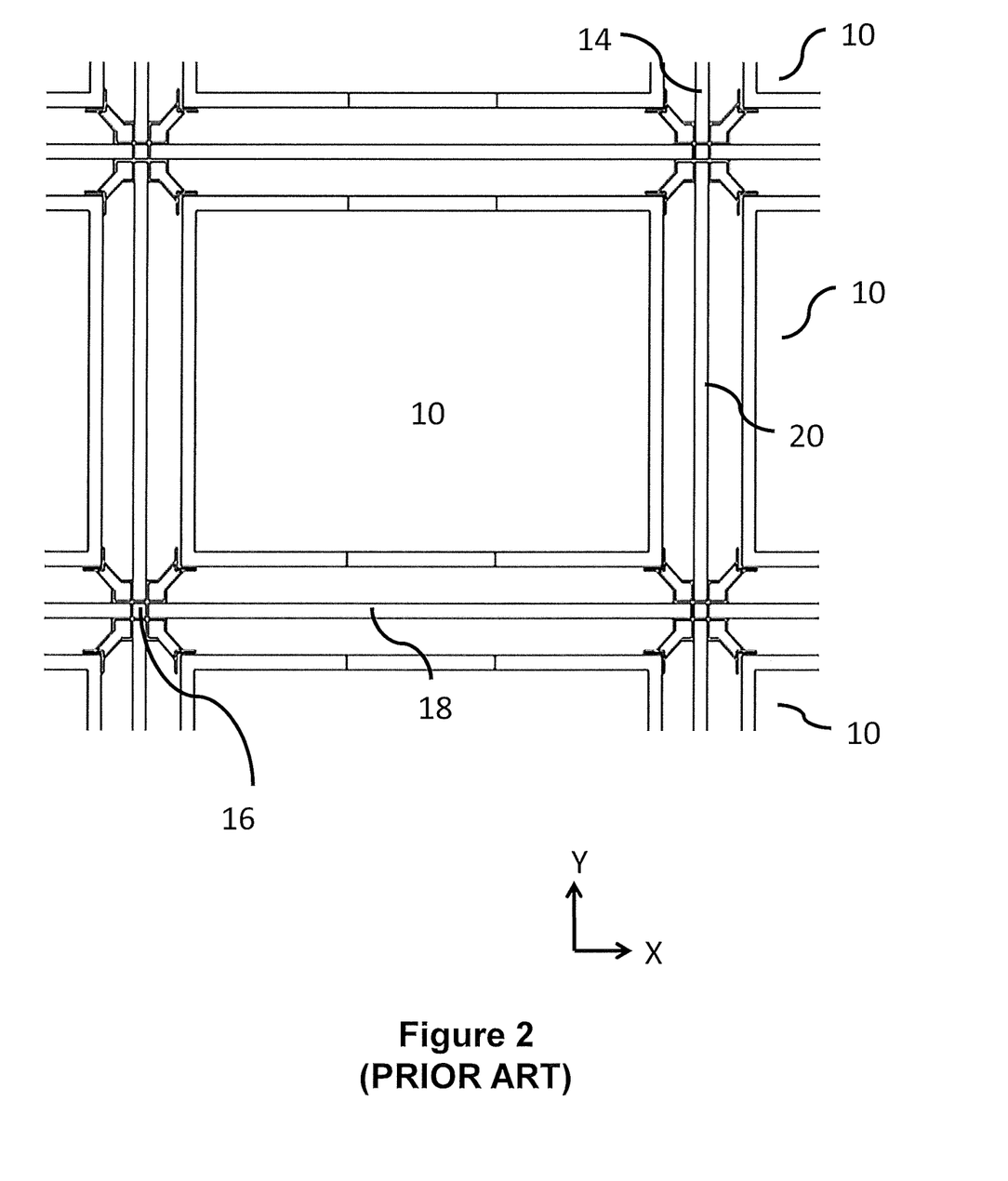
FIG. 2 is a schematic, plan view of part of the frame structure of FIG. 1.

As shown in FIGS. 1 and 2, stackable storage containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product or inventory items 28, and the inventory items within a bin 10 may be identical, or may be of different product types depending on the application. Furthermore, the bins 10 may be physically subdivided to accommodate a plurality of different inventory items 28.

In the description below, bins 10 will be used to denote containers intended for the storage of inventory items 28, whilst delivery containers DT will be used to denote containers intended to be filled with items 28 to fulfil orders placed by customers. It will be appreciated that this terminology is used for ease of reference and explanation within this document. However, it should be noted that the bins 10 and the containers DT may be of the same shape and configuration. Furthermore, delivery containers DT may be stored in bins 10 within the storage system or any part thereof.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 4:
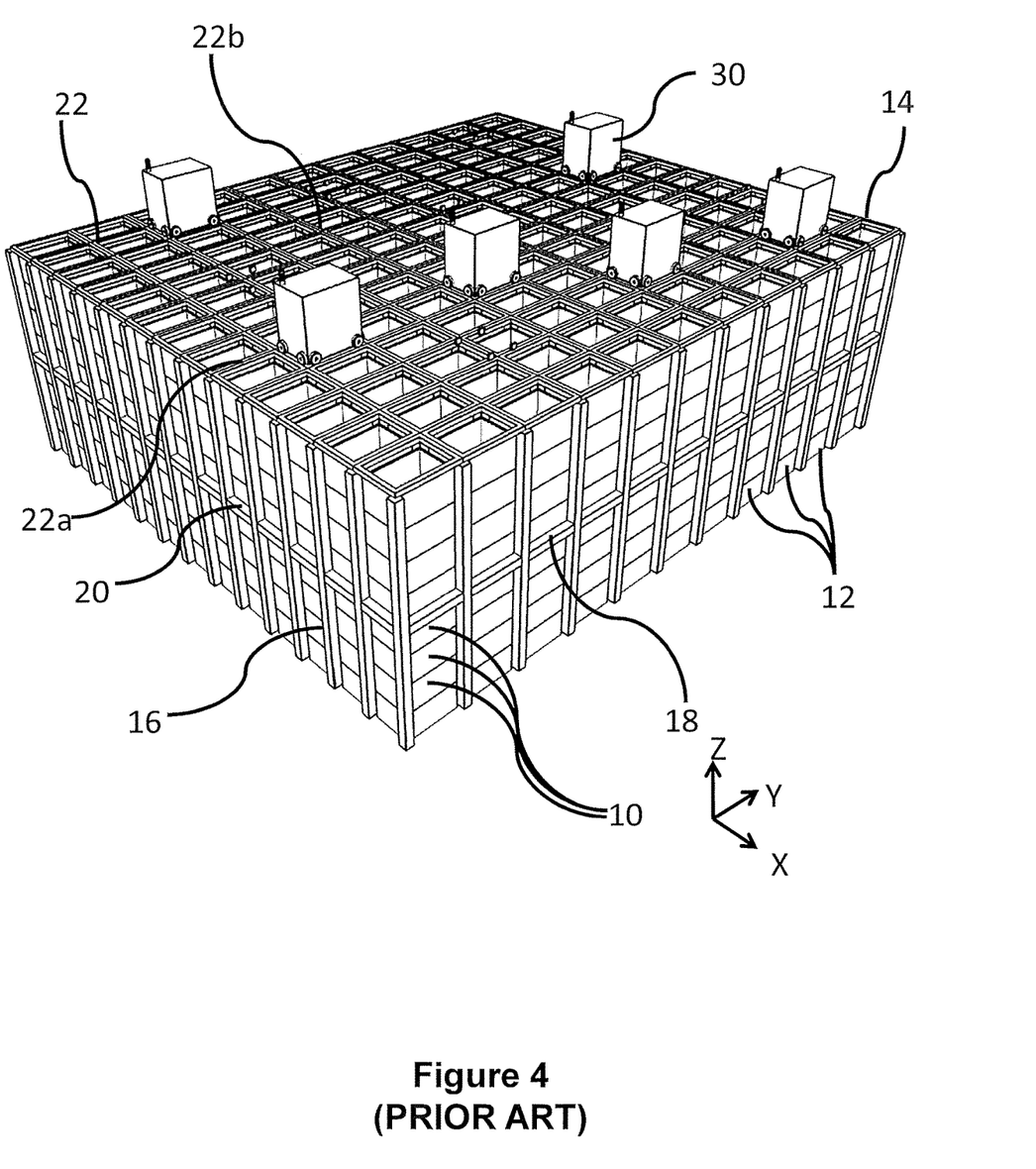
FIG. 4 is a schematic, perspective view of a known storage system comprising a plurality of load handler devices of the type shown in FIGS. 3(a), 3(b) and 3(c), installed on the frame structure of FIGS. 1 and 2, together with a robotic load handling device, together the framework and the load handling device comprising the main components of a storage system for storage and handling of items to be stored.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12.

A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being of a size capable of holding a bin 10. The lifting means 38 comprises winch means and a bin gripper assembly 39. The lifting means lifts a bin 10 from the stack 12 to within the cavity 40 within the body of the vehicle 32.

In this way, multiple products can be accessed from multiple locations the load handling devices being able to access containers from any stack.

The robotic load handling devices 30 remove bins 10 containing inventory items 28 (not shown) therein and transport the bins 10 to picking stations (not shown) where the required inventory items 28 are removed from the bins 10 and placed into bins 10 comprising delivery containers DT. It is important to note that a delivery container DT may fit within a bin 10. The bins 10 may comprise inventory items 28 or may comprise delivery containers DT. Furthermore, the delivery containers DT may comprise at least one bag 52, the inventory items 28 being picked directly in to a bag 52 at a pick station (not shown).

The empty bins 10 or the bins comprising delivery containers DT or the bins comprising delivery containers DT and bags 52 may all be stored within the stacks 12. It will be appreciated that all the bins 10 have substantially the same external shape and configuration.

FIG. 4 shows a typical storage system as described above, the system having a plurality of load handling devices 30 active on the grid above the stacks 12.

FIGS. 1 and 4 show the bins 10 in stacks 12 within the storage system. It will be appreciated that there may be a large number of bins 10 in any given storage system and that many different items 28 may be stored in the bins 10 in the stacks 12, each bin 10 may contain different categories of inventory items 28 within a single stack 12.

In one system described above and further in UK Patent Application Number GB1410441.8—Ocado Innovation Limited, hereby incorporated by reference, the storage system comprises a series of bins 10 that may further comprise delivery containers DT with customer orders contained therein or may further comprise bins 10 with inventory items 28 awaiting picking contained therein. These different bins 10 and combinations thereof may be contained in the storage system and be accessed by the robotic load handling devices 30 as described above.

It will be appreciated that the load handling devices 30 are robotic means for picking bins 10 from the stacks 12. However, it will be appreciated that modified load handling devices may be used to pick inventory items 28 directly from bins 10 or delivery containers DT (in the event items are to be returned to bins 10). In this regard, the robotic picking referred to above is not limited to devices picking bins 10 from stacks 12 but also includes devices picking items 28 directly from bins 10. However, it will be appreciated that in any storage system 1 there may be a combination of all of the above and picking may also be undertaken manually.

Figure 5:
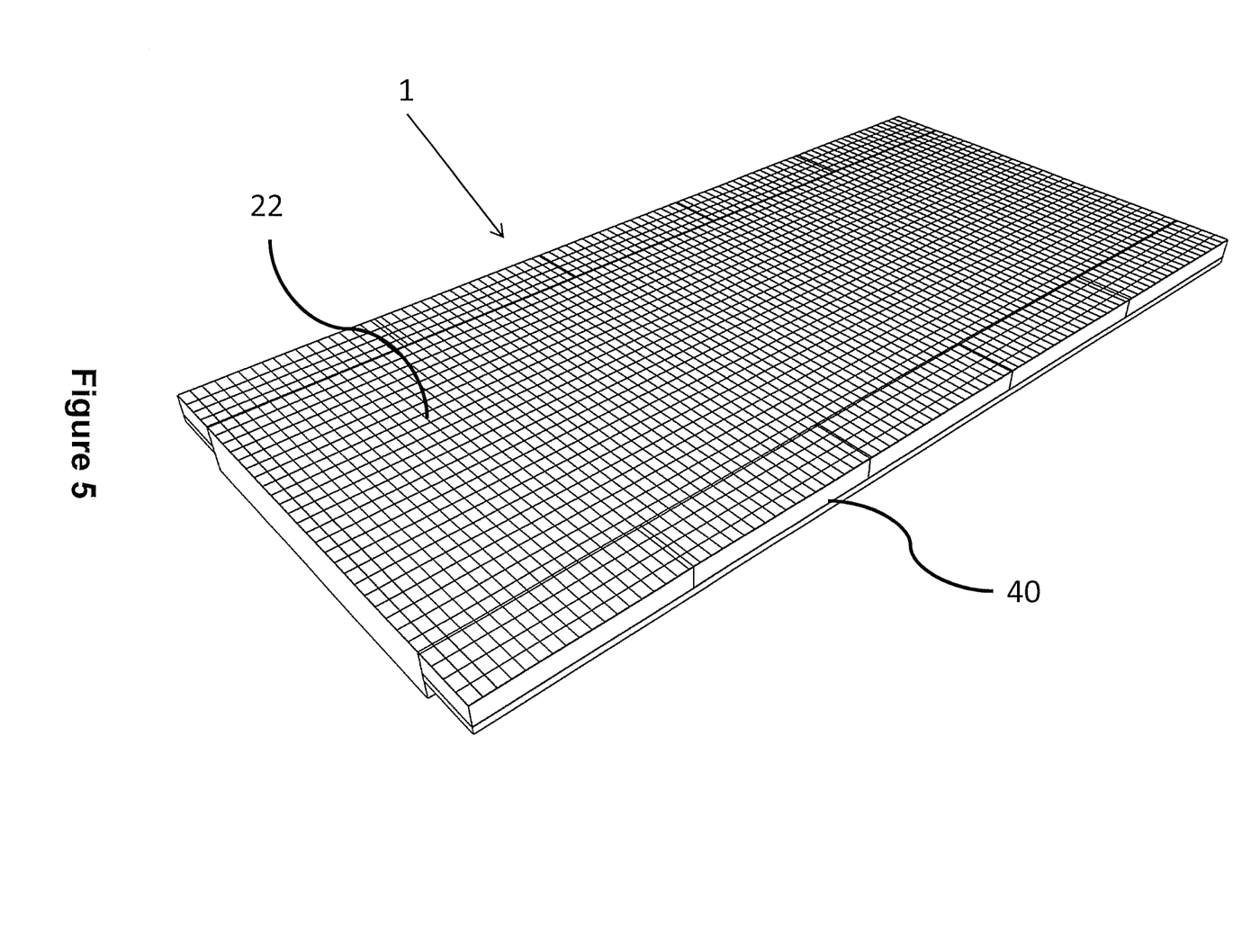
FIG. 5 is a schematic, perspective view of a storage system according to a first aspect of the invention showing the storage system of FIGS. 1 to 4, the system further comprising dispatch portions located along both sides of the storage system.

As shown in FIG. 5, in accordance with a first form of the invention, the storage system 1 as described with reference to FIGS. 1 to 4 above, may further comprise dispatch portions 40. These dispatch portions 40 may comprise areas where the grid 22 over the storage system extends above conveyance means 42.

Figure 7:
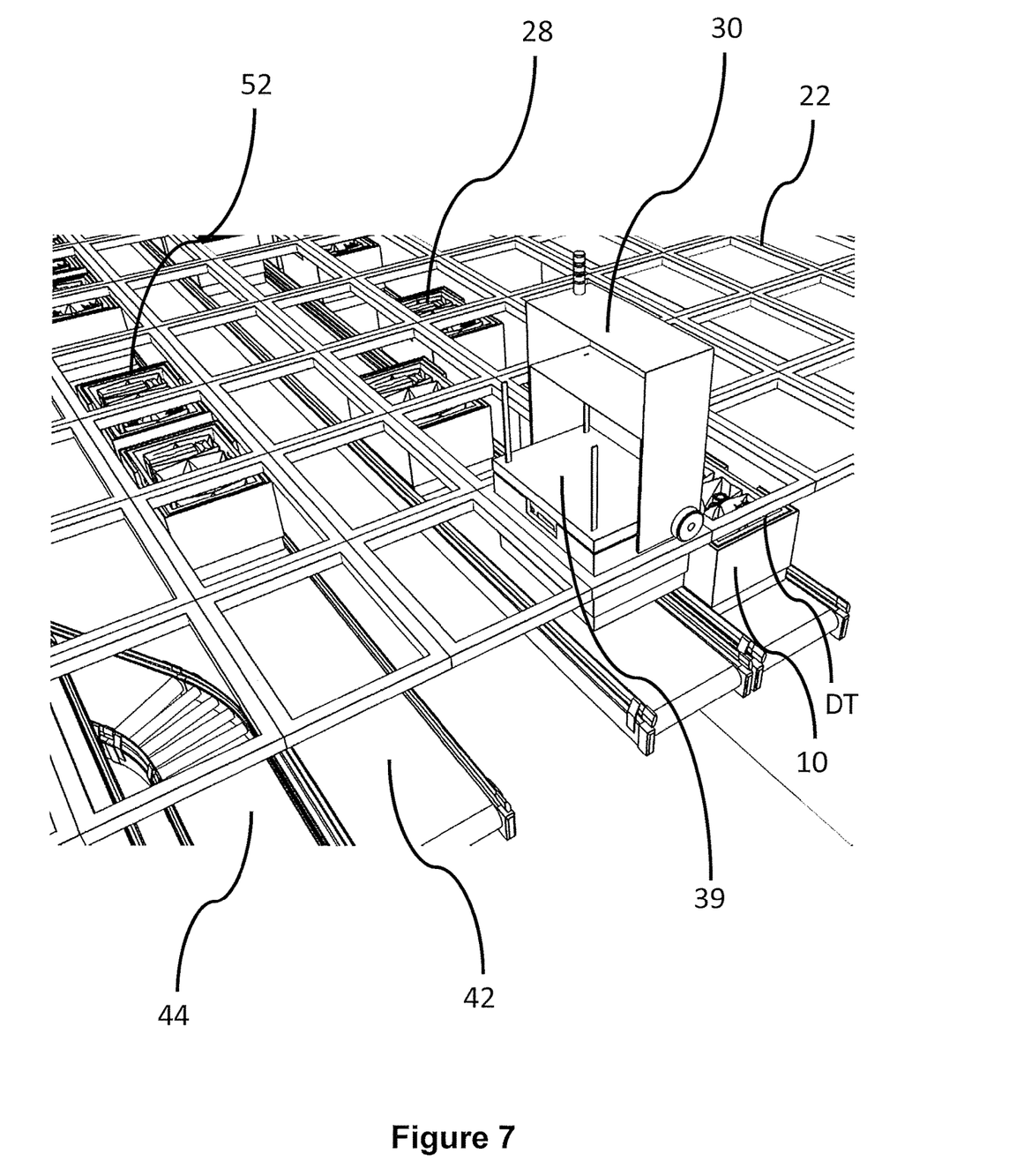
FIG. 7 is a schematic perspective view of the dispatch portion of the storage system of FIG. 6 in accordance with a first aspect of the invention, the dispatch portion comprising a number of bins comprising delivery containers, the containers comprising items to be delivered.

The conveyance means 42 comprises a length of conveyor. Load handling devices 30 remove bins 10 containing delivery containers DT from the storage system 1 and fill the conveyor with said bins 10 in positions beneath grid spacings as shown in FIG. 7. The conveyor is stationary whilst the bins 10 are being deposited by the load handling means 30.

It will be appreciated that the bins 10 comprising customer orders may have been temporarily stored within the storage system 1 having been picked earlier, either manually via pick stations (not shown) or the bins 10 may have been picked on the grid 22 by picking devices in accordance with Ocado Innovation Limited UK Patent Application Numbers GB 1519929.2 and 1519930.0 filed 11 Nov. 2015, hereby incorporated by reference.

Furthermore, it will be appreciated that the delivery containers DT may be filled directly by picking devices operative on the storage system 1 with items 28 within bins 10 in the storage system 1.

The number of positions on a dispatch conveyor 42 may be determined by the number of delivery containers DT capable of being loaded in to a vehicle for a single delivery route. Furthermore, the bins 10 comprising the delivery containers DT may be ordered such that once conveyed to a vehicle loading area, the bins 10 are in an appropriate order for loading in to the vehicle for the optimum positioning within the vehicle for the predetermined delivery route.

In use, the positions on the conveyor 42 are filled with bins 10 comprising delivery containers DT by load handling means 30 as shown in FIG. 7. The positions on the conveyor 42 are in a predetermined order to aid loading in to optimum positions within a delivery vehicle. However, it will be appreciated that the bins 10 need not be deposited in the predetermined sequence but may be deposited in the appropriate positions by the load handling devices 30.

For example, in the case where a delivery comprises 20 bins 10, the positions allocated to the conveyor 42 would be numbers 1 to 20. As the load handling devices 30 can access the positions above the conveyor 42 in any order it is not necessary for the bin required in position 1 to be deposited first, then the bin 10 required for position 2 to be deposited $2^{nd}$ and the bin 10 required for position 3 to be deposited $3^{rd}$ etc to the bin 10 required for position 20 to be deposited $20^{th}$. The bins 10 may be deposited in any order by the load handling devices 30. So for example, the bin 10 required for position 7 may be deposited first, then the bin 10 required for position 17 may be deposited $2^{nd}$ etc until all the positions are filled.

It will be appreciated that for a given predetermined delivery route, not all the positions on the conveyor need be filled.

The conveyance means may comprise pairs of conveyors 42, the conveyors 42 being independently moveable under the control of the centralised control utility. Advantageously, the positions on the first belt of the pair may be filled first and the first conveyor 42 activated by the control utility to transfer the containers 10 thereon onward. The positions on the second conveyor 42 may then be filled as required and the second conveyor activated by the control utility to transfer the containers 10 onward. This alternating use of the conveyors 42 enables the dispatch of the containers 10 to be continuous. Additionally, in the event of a malfunction of one conveyor 42, the second can continue operating.

It will further be noted that all the positions on the conveyance means 42 may be accessed by load handling devices 30, concurrently, thereby speeding up the consolidation of the route or grouping on the conveyor.

Grouping on the conveyor may be arranged to form a delivery route for a vehicle. However, there may be other groupings envisaged, for example a group of delivery containers DT may be grouped for delivery to a customer collection point such as for a click and collect location.

Once all the required positions are filled, the conveyor 42 may be moved under the control of a centralised control utility such that the bins 10 comprising the delivery containers DT are moved from the dispatch portion 40 of the system 1 to a vehicle loading area (not shown).

It will be appreciated in the example above that the delivery containers DT will be removed from the bins 10 prior to the loading of the vehicles. This may occur immediately before the vehicle loading area. However, it will further be appreciated that the storage system may comprise delivery containers DT not contained in bins 10, therefore it may not be a requirement that the delivery containers DT are removed from the storage bins 10 prior to loading on a vehicle.

Figure 6:
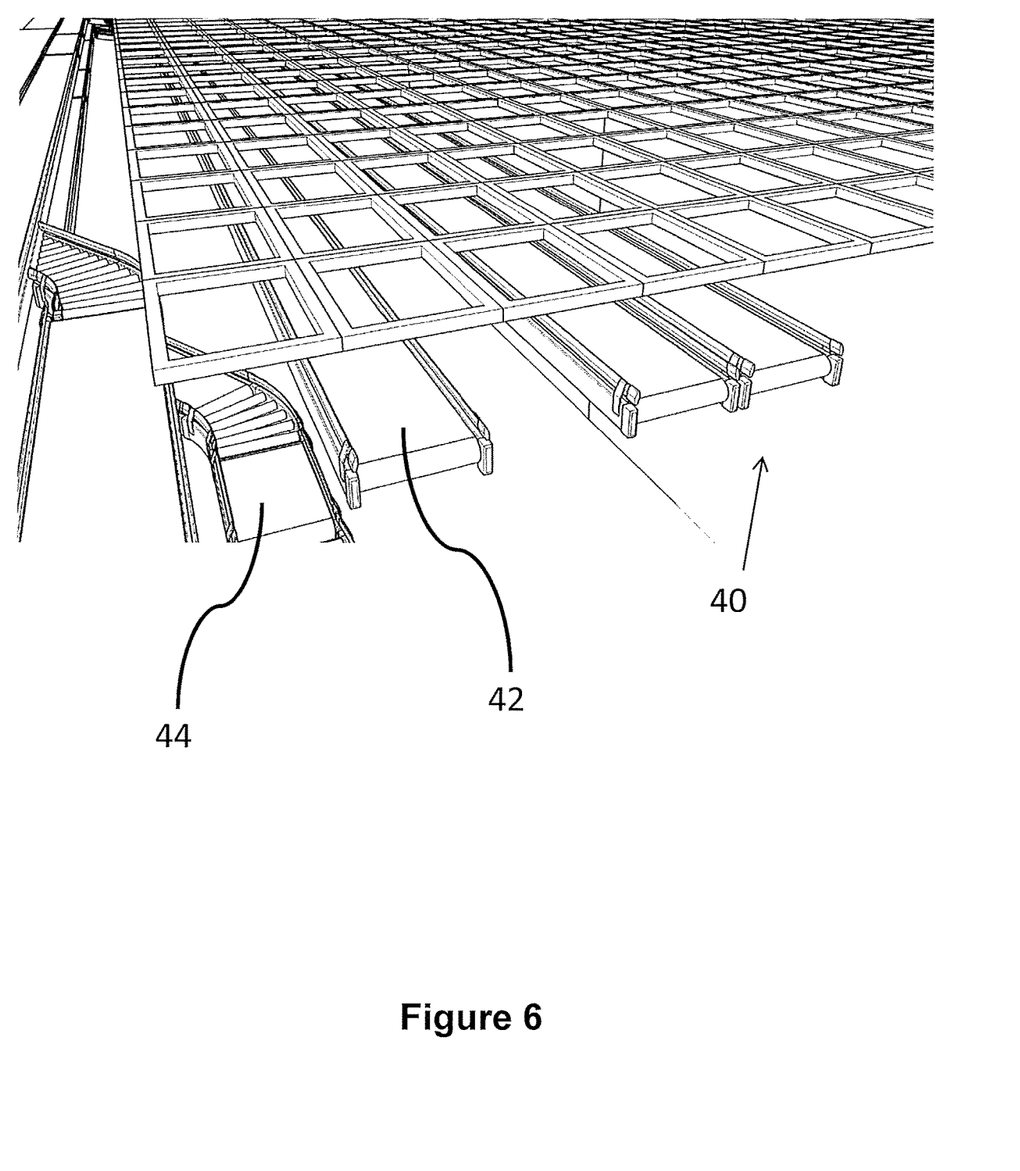
FIG. 6 is a schematic perspective view of a dispatch portion of the storage system of FIGS. 1 to 4 in accordance with a first aspect of the invention showing belts on which bins containing items ready for dispatch may be deposited prior to transfer to vehicles for delivery.

In the example described above with reference to FIGS. 6 and 7, the conveyors 42 adjoin additional conveyance means 44 that transport the group of bins 10 to the loading area. In FIGS. 6 and 7, the dispatch conveyors 42 and the additional conveyor belt systems run parallel to the length of the storage system 1 as shown in FIG. 7.

Figure 8A:
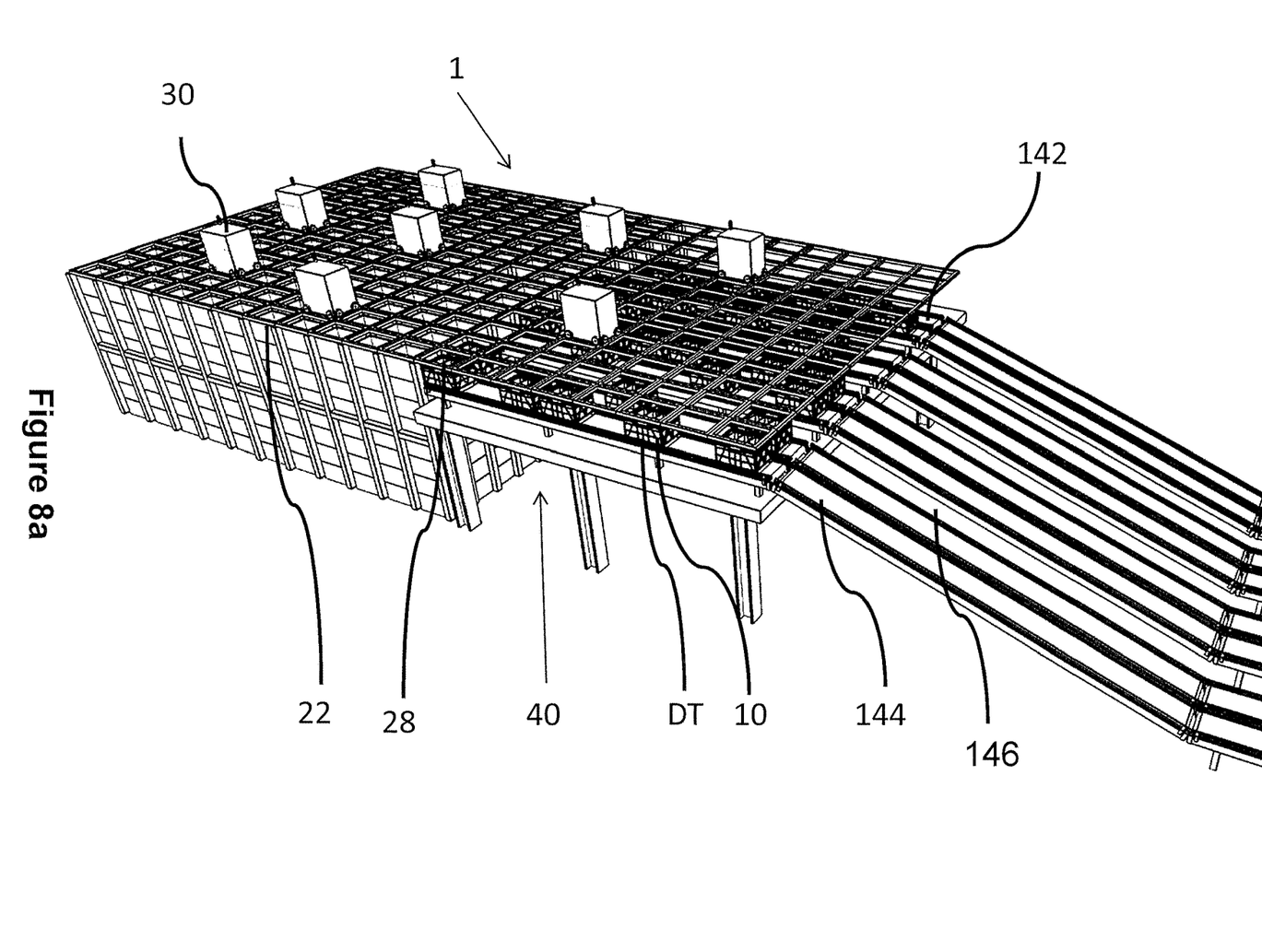
FIG. 8a is a schematic perspective view of one form of dispatch portion of FIGS. 5 to 7 in accordance with one form of the invention, showing load handling devices operative on the storage system and the dispatch portion with an alternative form of conveyance system for moving the bins ready for movement to a vehicle loading area.
Figure 8B:
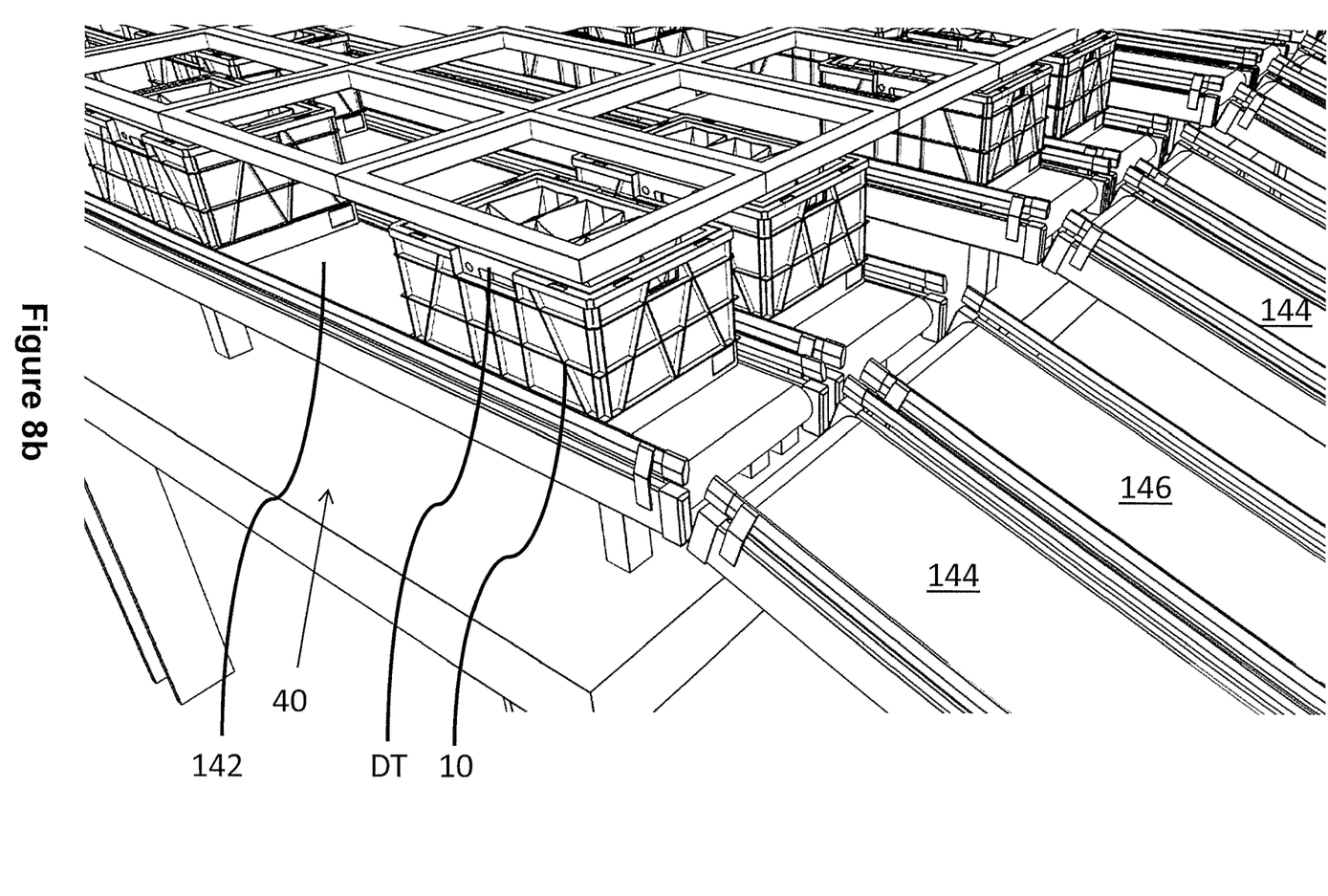
FIG. 8b is a schematic perspective view of the dispatch portion of FIG. 8a showing the bins comprising delivery containers on the dispatch belts, awaiting missing bins to be deposited in the empty locations on the dispatch belts, prior to movement of the bins to a vehicle loading area.

FIGS. 8a and 8b show an alternative embodiment of the invention where the dispatch belts 142 and the additional conveyors 144, 146 extend substantially perpendicularly to the storage system 1. It will be appreciated that in this way the conveyor 142, 146 may be used as an accumulation store for bins 10 being moved to the loading area. This advantageously reduces congestion at pick stations (not shown) relative to the dispatch area 40. Additionally, this arrangement organises and creates a backlog of work for vehicle loaders. In the embodiment shown in FIGS. 8a and 8b, each vehicle loader may access at least two additional conveyors 144, 146. Therefore, whilst the content of conveyor 144 is being loaded, conveyor 146 may be being filled ready for loading. Therefore, the vehicle loader may move from one conveyance means 142 to the next 144, and the loading may be continual if required.

The first form of the invention as described above, is disclosed with reference to storage systems, as described, outputting sequences of containers for loading in to vehicles and for onward delivery to customers. However, it will be appreciated that there are other occasions where it would be advantageous to sequence containers within a storage and picking system and that the invention is not limited to dispatch of containers from the system.

For example, in a second embodiment of the invention, the sequencing system may be used to sequence bins 10 containing inventory items 28 during transit or prior transit to a pick station (not shown) to ensure that items 28 can be picked from the bins 10 in to the delivery containers DT in a correct or predetermined order. For example, it would be advantageous for heavy items to be picked for a customer order to be picked in to a delivery container DT prior to delicate or fragile items.

In a third embodiment of the invention, the sequencing system may be used to sequence bins 10 containing inventory items 28 to enable said items 28 to be robotically picked in to delivery containers DT. It will be appreciated that such robotic picking may occur at pick stations, on the storage system 1 or at the dispatch portions 40 previously described. Furthermore, the sequencing system may be used to sequence delivery containers DT in order to return previously picked items to bins 10 in the event that said items need to be returned.

In a fourth embodiment of the invention, the sequencing system may be used to sequence bins 10 containing inventory items 28 or delivery containers 10 should said bins 10 or containers DT need to be transferred between two sections of storage system 1, for example when transferring said bins 10 or containers 28 between ambient or chilled portions of the storage system 1. It will be appreciated that sequencing containers DT or bins 10 or bins 10 containing DTs or bins 10 containing inventory items 28 may be advantageous in numerous grid-to-grid transfer situations.

In a fifth embodiment of the invention, the sequencing system may be used to sequence bins from multiple storage systems, where the multiple storage systems may be used to fulfil single orders by picking goods in sequence from individual storage systems and combining them for delivery. Such individual grids may comprise products having common characteristics, for example, all heavy goods in a first system, chilled goods in a second system, ambient goods in a third system, the sequencing system being used to combine and order items picked for delivery.

It will be appreciated that there are many situations where it would be advantageous to sequence delivery containers DT containing customer orders or parts thereof, bins 10 containing inventory items 28, and bins 10 containing delivery containers DT and that the invention is not limited to the examples described above.

A plurality of the robotic handling devices 30, for instance as described above and in UK Patent Application No. GB1413155.1—Ocado Innovation Limited, hereby incorporated by reference, may be operative on the grid 22 system and under control of a separate centralised control utility as described in UK Patent Application No. GB1509613.4—Ocado Innovation Limited, hereby incorporated by reference.

In addition to the robotic load handling devices 30 there may be a plurality of additional, robotic picking devices 130 capable of handling bins 10 of varying sizes operative on the grid 22. The use of robotic load handlers in the manner described in, for example, UK Patent Application No GB1410127.3—Ocado Innovation Limited may be envisaged, and such load handling devices are hereby incorporated by reference.

Furthermore, it will be appreciated that the above exemplary embodiments are described with reference to a storage system 1 comprising load handling devices 30 lifting bins 10 from beneath the grid 22 and moving them to picking stations (not shown) for items 28 to be removed and deposited in delivery containers DT, the delivery containers DT being storable in the storage system awaiting dispatch. However, it will be appreciated that the delivery containers may be moved from the pick stations directly to the dispatch portion 40 of the grid 22. Furthermore, it will be appreciated that the delivery containers 10 may be temporarily stored in a stack 12 within the framework 14 of the storage system.

Furthermore, it will be appreciated that the load handling devices 30 need not transport the bins 10 to the pick stations for items 28 to be picked in to delivery containers DT. The delivery containers 10 may be filled by direct picking of items 28 from bins within storage system via load handling devices comprising picking means. Furthermore, load handling devices 30 comprising picking means may pick items directly in to delivery containers 10 located on the conveyance means 42, 142.

It should be noted that the delivery container DT may be an actual delivery container for onward transmission to the customer or be a bin 10 with "post pick" items destined for delivery to somewhere else, for instance to an alternative fulfilment centre. The term delivery container DT is used to distinguish bins 10 from delivery containers DT. However, it will be appreciated that bins and DTs may be of a similar or substantially the same shape and configuration, the function of the bin defining the definition rather than any change in the actual shape or size of the bin.

It will also be appreciated that the delivery container DT may be contained within a bin 10 to ensure that the robotic load handling devices can handle the movement of all bins whether in the stacks 12 of the main storage system or in a nominal robotic picking area.

It will be appreciated that the storage and picking system described above may be for the use of storage and picking of grocery orders for an online order fulfilment service. However, many other uses are envisaged and it should be noted that the items 28 may comprise any item capable of being stored, contained or located in a container 10 such as parcels or spare parts.

The invention claimed is:

1. A storage and picking system, comprising:
   a storage portion and a dispatch portion;
   the storage portion including:
      a first set of substantially parallel rails or tracks, and a second set of substantially parallel rails or tracks extending substantially perpendicularly to the first set in a substantially horizontal plane, to form a grid-like pattern of tracks and a plurality of grid spaces;
      a set of uprights supporting the tracks, the uprights and tracks together defining a framework;
      a plurality of containers located in a plurality of stacks beneath the tracks and within the framework, each stack of the containers occupying space below a grid space; and
      a plurality of load handling devices operable on the grid, the load handling devices including means for lifting containers from first stacks of the plurality of stacks beneath the tracks, and means for depositing containers onto tops of other stacks of the plurality of stacks beneath the tracks; and
   the dispatch portion including:
      a sequencing system, wherein the sequencing system includes:
         a section of tracks disposed above conveyance means, the conveyance means arranged to hold in a substantially stationary manner load handling device delivered containers in a series of positions defined to correspond to the grid spaces above the conveyance means on the section of tracks, wherein the load handling device delivered containers are deposited by load handling devices on the section of tracks directly to the conveyance means, said positions on the conveyance means being allocatable and accessible for containers to be deposited thereon, the conveyance means being further arranged to convey the deposited containers, located in the sequenced positions once the sequenced positions are substantially filled, the load handling device delivered containers being deposited on the conveyance means in a predetermined order for dispatch, said predetermined order being independent of an order in which the load handling devices retrieve the containers from the plurality of stacks in the storage portion of the storage system.

2. The storage and picking system according to claim 1, comprising:
   a centralised control utility, wherein the load handling devices are configured to deposit retrieved containers in allocated positions on the conveyance means under control of the centralised control utility, the control utility defining an order in which containers are deposited in allocated positions, an allocation being independent of an order in which the containers are to be delivered by the load handling devices.

3. The storage and picking system according to claim 1, comprising:
   a centralised control utility, wherein the load handling devices are configured to deposit retrieved containers in allocated positions on the conveyance means under control of the centralised control utility, the control utility enabling a number of load handling devices to deposit a number of containers in to said allocated positions concurrently.

4. The storage and picking system according to claim 1, in which the conveyance means comprises:
   at least two conveyor belts, said conveyor belts being independently movable such that all positions on each conveyor belt are accessible to be filled whilst the conveyor belt is stationary.

5. The storage and picking system according to claim 4, in which each conveyor belt is configured to move only after all specified positions on the belt are filled with load handling device delivered containers, said conveyor belts being movable in sequence under control of a centralised control utility.

6. The storage and picking system according to claim 1, the sequencing system of the dispatch portion comprising:
   a series of additional conveyance means, the additional conveyance means being configured to transfer containers from the conveyance means to a vehicle loading area.

7. The storage and picking system according to claim 1, in which the containers in the sequencing system of the dispatch portion comprise:
   items for fulfilling customer orders for onward movement to a dispatch area.

8. A method of dispatching containers from a storage and order picking system in a predetermined sequence, the storage and order picking system having:
   a first set of substantially parallel rails or tracks, and a second set of substantially parallel rails or tracks extending substantially perpendicularly to the first set in a substantially horizontal plane, to form a grid-like pattern of tracks with a plurality of grid spaces;
   a set of uprights supporting the tracks, the uprights and tracks together defining a framework;

a plurality of containers located in a plurality of stacks beneath the tracks in stacks and within the framework, each stack of the containers occupying a space below a grid space; and a plurality of load handling devices operable on the grid, the load handling devices having means for lifting containers from first stacks of the plurality of stacks beneath the tracks and means for depositing containers onto tops of other stacks of the plurality of stacks beneath the tracks, the dispatch portion including a sequencing system, wherein the sequencing system includes:

a section of tracks disposed above conveyance means, the conveyance means arranged to hold in a substantially stationary manner load handling device delivered containers in a series of positions, wherein the load handling device delivered containers are deposited by the load handling devices on the section of tracks directly to the conveyance means, said positions on said conveyance means being defined to correspond to the grid spaces above the conveyance means on the sections of tracks, said positions on the conveyance means being allocatable and accessible for containers to be deposited thereon, the method comprising:

(a) retrieving a container from the storage portion of the storage system, said container being retrieved using a load handling device;

(b) transporting the retrieved container from the storage portion to the dispatch portion of the storage system using the load handling device;

(c) depositing the container in a first position on the conveyance means;

(d) repeating steps (a), (b) and (c) until all specified positions on the conveyance means are filled, the load handling device delivered containers being deposited on the conveyance means in a predetermined order for dispatch, said predetermined order being independent of an order in which the load handling devices retrieve the containers from the stacks in the storage portion of the storage system; and (e) once all specified positions on the conveyance means are filled with load handling device delivered containers, conveying the sequenced containers away from the dispatch portion of the storage system.

9. The method according to claim 8, comprising:
filling the specified positions on the conveyance means in an order independent of an order in which the load handing device delivered containers are to be deposited on the conveyance means.

10. The method according to claim 8, comprising:
filling multiple positions on the conveyance means concurrently, the multiple positions being filled by a plurality of load handling devices depositing containers concurrently.

11. The method according to claim 8 in which the containers comprise:
items for delivery to customers.

12. The method according to claim 8, comprising:
storing items in the containers within the storage system; and
robotically picking the containers from the storage system under control of a centralised control utility.

13. The method according to claim 8, comprising:
storing items in the containers within the storage system; and
robotically picking the items from the containers within the storage system under control of a centralised control utility.

14. A sequencing system in combination with the storage and picking system according to claim 1, in which the containers in the sequencing system comprise:
parcels for onward delivery to a plurality of independent locations.

15. A sequencing system in combination with the storage and picking system according to claim 1 in which the containers comprise items for delivery to customers.

16. The sequencing system for a storage and picking system according to claim 15 in which the items are stored in the containers within the storage system and the containers are robotically picked from the storage system under the control of a centralised control utility.

17. The sequencing system for a storage and picking system according to claim 15 in which the items are stored in the containers within the storage system and the items are robotically picked from the containers within the storage system under the control of a centralised control utility.

* * * * *